US009185649B2

(12) United States Patent
Sahu et al.

(10) Patent No.: US 9,185,649 B2
(45) Date of Patent: Nov. 10, 2015

(54) HIGH-SPEED DATA CHANNEL AVAILABILITY

(71) Applicant: QUALCOMM Incorporated, San Diego, CA (US)

(72) Inventors: Debesh Kumar Sahu, Andhra Pradesh (IN); George Cherian, San Diego, CA (US); Venkata Siva Prasad Gude, San Diego, CA (US); Neelalanta Venkata Seshachalam Chimmapudi, Andhra Pradesh (IN); Sachin Jain, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 13/772,761

(22) Filed: Feb. 21, 2013

(65) Prior Publication Data

US 2013/0258925 A1  Oct. 3, 2013

Related U.S. Application Data

(60) Provisional application No. 61/618,498, filed on Mar. 30, 2012.

(51) Int. Cl.
*H04W 52/02* (2009.01)
*H04W 76/00* (2009.01)
(Continued)

(52) U.S. Cl.
CPC ........... *H04W 52/0225* (2013.01); *H04L 69/28* (2013.01); *H04W 4/005* (2013.01); *H04W 52/0209* (2013.01); *H04W 52/0229* (2013.01); *H04W 76/00* (2013.01); *H04W 76/048* (2013.01)

(58) Field of Classification Search
USPC ................. 370/235, 311, 328–338, 447, 514; 455/70, 450–453; 709/231
See application file for complete search history.

(56) References Cited

U.S. PATENT DOCUMENTS 5,680,633 A * 10/1997 Koenck ................. G06F 1/1626
                                                235/462.46
5,946,356 A *  8/1999 Felix ..................... H04B 1/707
                                                370/311

(Continued)

FOREIGN PATENT DOCUMENTS

DE    10336859 A1 *  3/2005
EP     1613107 A2    1/2006
GB     2390263 A    12/2003

OTHER PUBLICATIONS

Attar, R., et al., "1x enhancements for m2m (Stage 2); C20-20120206-XYZ QCOM; C20-20120206-008_Qualcomm_1x_m2m_stage2_v6", Feb. 5, 2012, pp. 1-50, XP055047709.

(Continued)

Primary Examiner — Edan Orgad
Assistant Examiner — Steven Willmore
(74) Attorney, Agent, or Firm — QUALCOMM IP Department; James Hunt Yancey, Jr.

(57) ABSTRACT

Apparatus and methods for optimizing data transmission include receiving an indicator indicating the availability of a first communication channel, the first communication channel having a higher data rate than a second communication channel. Aspects can include determining whether the first communication channel is available to transmit data based on the indicator, and transmitting the data via the first communication channel, upon determining that the first communication channel is available. Additionally, aspects include entering a sleep state, upon determining that the first communication channel is not available, and determining whether the first communication channel has become available during a subsequent awake period. Entering a sleep state and determining whether the first communication channel has become available during a subsequent awake period may occur until the first communication channel becomes available or until an expiration of a timer. Other aspects, embodiments, and features are also claimed and described.

44 Claims, 11 Drawing Sheets

(51) Int. Cl.
*H04W 4/00* (2009.01)
*H04L 29/06* (2006.01)
*H04W 76/04* (2009.01)

(56) References Cited

U.S. PATENT DOCUMENTS

| | | | | |
|---|---|---|---|---|
| 5,966,384 | A * | 10/1999 | Felix | H04L 1/1887 370/209 |
| 6,226,279 | B1 * | 5/2001 | Hansson | H04L 12/413 370/328 |
| 6,301,231 | B1 * | 10/2001 | Hassan | H04B 7/18534 342/352 |
| 6,643,272 | B1 * | 11/2003 | Moon | H04W 52/50 370/311 |
| 6,741,580 | B1 * | 5/2004 | Kim | H04W 48/12 370/337 |
| 6,754,189 | B1 | 6/2004 | Cloutier et al. | |
| 6,801,775 | B1 * | 10/2004 | Gibbons | H04W 72/02 455/426.1 |
| 6,804,219 | B2 | 10/2004 | Koo et al. | |
| 6,996,131 | B1 * | 2/2006 | Islam | H04W 68/00 370/320 |
| 7,181,223 | B1 * | 2/2007 | Pecen | H04W 72/1278 370/329 |
| 7,349,714 | B2 * | 3/2008 | Lee | H04W 52/40 370/329 |
| 7,693,175 | B1 * | 4/2010 | Benveniste | H04W 74/002 370/338 |
| 8,027,327 | B2 * | 9/2011 | Gupta | H04W 74/0875 370/344 |
| 2002/0137520 | A1 * | 9/2002 | Dillon | H04L 1/0003 455/453 |
| 2002/0172178 | A1 | 11/2002 | Suzuki et al. | |
| 2003/0067920 | A1 * | 4/2003 | Rezaiifar | H04L 1/1809 370/394 |
| 2003/0133415 | A1 | 7/2003 | Kim et al. | |
| 2004/0196861 | A1 | 10/2004 | Rinchiuso et al. | |
| 2005/0287949 | A1 | 12/2005 | Harris et al. | |
| 2006/0114867 | A1 * | 6/2006 | Du | H04W 74/002 370/338 |
| 2006/0116149 | A1 * | 6/2006 | Dunn | H04W 72/005 455/518 |
| 2007/0147310 | A1 * | 6/2007 | Cai | H04W 74/008 370/335 |
| 2007/0211748 | A1 * | 9/2007 | Stephens | H04W 74/0816 370/445 |
| 2009/0006641 | A1 * | 1/2009 | Yaqoob | H04L 12/1868 709/231 |
| 2009/0016273 | A1 * | 1/2009 | Kanterakis | H04W 74/008 370/328 |
| 2009/0219816 | A1 * | 9/2009 | Rezaiifar | H04W 74/0866 370/235 |
| 2010/0081394 | A1 * | 4/2010 | Mashimo | H04W 16/14 455/70 |
| 2011/0085484 | A1 * | 4/2011 | Mahany | H04B 1/692 370/311 |
| 2011/0134818 | A1 * | 6/2011 | Bae | H04W 74/0816 370/311 |
| 2011/0140846 | A1 | 6/2011 | Blanz et al. | |
| 2011/0149843 | A1 * | 6/2011 | Hwang | H04L 1/188 370/328 |
| 2011/0182178 | A1 * | 7/2011 | Du | H04L 12/413 370/230 |
| 2011/0222486 | A1 * | 9/2011 | Hart | H04L 5/001 370/329 |
| 2012/0052860 | A1 * | 3/2012 | Faronius | H04W 68/02 455/426.1 |
| 2012/0099587 | A1 | 4/2012 | Fan | |
| 2012/0207036 | A1 * | 8/2012 | Ong | H04W 74/0816 370/252 |
| 2013/0114506 | A1 * | 5/2013 | Cai | H04W 4/06 370/328 |

OTHER PUBLICATIONS

Attar R., et al., "Enhancements to CDMA2000 Ix for M2M communications", GLOBECOM Workshops (GC WKSHPS), 2012 IEEE, IEEE, Dec. 3, 2012, pp. 1675-1680, XP032341637, DOI: 10.1109/GL0C0MW.2012.6477837 ISBN: 978-14673-4942-0 p. 1679.
He, L., et al., "1xM2M: Stage 3 changes for Joing R-FCH and R-SCH Assignment; C20-20120206-014_Qualcomm_1xM2M_Joint R-FCH_R-SCH_Assignment", Feb. 5, 2012, XP055047747.
International Search Report and Written Opinion—PCT/US2013/034459, International Search Authority—European Patent Office, Dec. 4, 2013.
Partial International Search Report—PCT/US2013/034459—ISA/EPO—Sep. 19, 2013.
Taiwan Search Report—TW102111466—TIPO—Nov. 26, 2011.
Chapter II Demand; Article 34 Amendment; Response to Written Opinion; PCT/US13/034559; Mar. 3, 2014.
Second Written Opinion (408); International Preliminary Examining Authority; PCT/US2013/034459 Jul. 9, 2014.
Notification of Transmittal of the International Preliminary Report on Patentability (416); International Preliminary Examining Authority; PCT/US2013/034459; Aug. 29, 2014.

* cited by examiner

HIGH-SPEED DATA CHANNEL AVAILABILITY

PRIORITY CLAIM

This Application claims priority to Provisional Application No. 61/618,498 entitled "High-Speed Data Channel Availability" filed Mar. 30, 2012, and assigned to the assignee hereof and hereby expressly incorporated by reference herein.

TECHNICAL FIELD

The technology discussed in this patent application relates generally to wireless communication systems, and more particularly, to determining the availability of high-speed data channels for machine-to-machine communication. Features of the present invention enable and provide power efficient communications.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continues to advance the UMTS technologies not only to meet the growing demand for mobile broadband access, but to advance and enhance the user experience with mobile communications.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with one or more aspects and corresponding disclosure thereof, systems and methodologies are described for optimizing data transmission. For example, but not limited hereto, machine-to-machine (M2M) devices may request supplemental channel (SCH) access in an origination message in order to transmit data. However, the supplemental channel, which typically has a higher data rate than the fundamental channel (FCH) for transmitting data, may be unavailable. A typical M2M device may spend more time sending the same amount of data on the FCH than on the SCH, causing the device to use more power by keeping the modem on for a longer period of time. As such, an M2M may be informed about SCH availability to save power. If the SCH is not available at a time when the M2M has data to send, the M2M may enter a sleep mode, and check for availability again during its next scheduled awake period. The M2M may repeat this sleep and check cycle for a configurable back-off period. The back-off period may indicate a time period or a number of cycles the device is allowed to wait for the SCH to become available. If the back-off period expires and the SCH is still not available, the M2M may transmit the data at that time even if the transmission would require use of the FCH.

In one aspect, a method for optimizing data transmission is described. The method may include receiving an indicator indicating the availability of a first communication channel, the first communication channel having a higher data rate than a second communication channel. The method may include determining whether the first communication channel is available to transmit data based on the indicator. The method may include transmitting the data via the first communication channel, upon determining that the first communication channel is available. The method may include entering a sleep state, upon determining that the first communication channel is not available, and determining whether the first communication channel has become available during a subsequent awake period. In an example, entering a sleep state and determining whether the first communication channel has become available during a subsequent awake period may occur until the first communication channel becomes available or until the expiration of a back-off timer.

In one aspect, an apparatus for optimizing data transmission is described. The apparatus may include means for receiving an indicator indicating the availability of a first communication channel, the first communication channel having a higher data rate than a second communication channel. The apparatus may include means for determining whether the first communication channel is available to transmit data based on the indicator. The apparatus may include means for transmitting the data via the first communication channel, upon determining that the first communication channel is available. The apparatus may include means for entering a sleep state and determining whether the first communication channel has become available during a subsequent awake period, upon determining that the first communication channel is not available. In an example, entering a sleep state and determining whether the first communication channel has become available during a subsequent awake period may occur until the first communication channel becomes available or until the expiration of a back-off timer.

In one aspect, an apparatus for optimizing data transmission is described. The apparatus may include at least one processor and a memory coupled to the at least one processor. The at least one processor may be configured to receive an indicator indicating the availability of a first communication channel, the first communication channel having a higher data rate than a second communication channel. The at least one processor may be configured to determine whether the first communication channel is available to transmit data based on the indicator. The at least one processor may be configured to transmit the data via the first communication channel, upon determining that the first communication channel is available. The at least one processor may be configured to enter a sleep state and determining whether the first communication channel has become available during a subsequent awake period, upon determining that the first communication channel is not available, and enter a sleep state and determining whether the first communication channel has become available during a subsequent awake period occurs until the first communication channel becomes available or until the expiration of a back-off timer. In an example, entering a sleep state and determining whether the first communication channel has become available during a subsequent awake period may occur until the first communication channel becomes available or until the expiration of a back-off timer.

In one aspect, a computer program product for optimizing data transmission is described. The computer program product may include a non-transitory computer-readable medium, which may include code. The code may be for receiving an indicator indicating the availability of a first communication channel, the first communication channel having a higher data rate than a second communication channel. The code may be for determining whether the first communication channel is available to transmit data based on the indicator. The code may be for transmitting the data via the first communication channel, upon determining that the first communication channel is available. The code may be for entering a sleep state, upon determining that the first communication channel is not available, and determining whether the first communication channel has become available during a subsequent awake period. In an example, entering a sleep state and determining whether the first communication channel has become available during a subsequent awake period may occur until the first communication channel becomes available or until the expiration of a back-off timer.

In one aspect, a method for optimizing data transmission is described. The method may include periodically transmitting an indicator indicating the availability of a first communication channel, the first communication channel having a higher data rate than a second communication channel. The method may include receiving a request for access to the first communication channel. The method may include determining whether to grant access to the first communication channel based on a class value associated with a device that sent the request.

In one aspect, an apparatus for optimizing data transmission is described. The apparatus may include means for periodically transmitting an indicator indicating the availability of a first communication channel, the first communication channel having a higher data rate than a second communication channel. The apparatus may include means for receiving a request for access to the first communication channel. The apparatus may include means for determining whether to grant access to the first communication channel based on a class value associated with a device that sent the request.

In one aspect, an apparatus for optimizing data transmission is described. The apparatus may include at least one processor and a memory coupled to the at least one processor. The at least one processor may be configured to periodically transmit an indicator indicating the availability of a first communication channel, the first communication channel having a higher data rate than a second communication channel. The at least one processor may be configured to receive a request for access to the first communication channel. The at least one processor may be configured to determine whether to grant access to the first communication channel based on a class value associated with a device that sent the request.

In one aspect, a computer program product for optimizing data transmission is described. The computer program product may include a non-transitory computer-readable medium, which may include code. The code may be for periodically transmitting an indicator indicating the availability of a first communication channel, the first communication channel having a higher data rate than a second communication channel. The code may be for receiving a request for access to the first communication channel. The code may be for determining whether to grant access to the first communication channel based on a class value associated with a device that sent the request.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
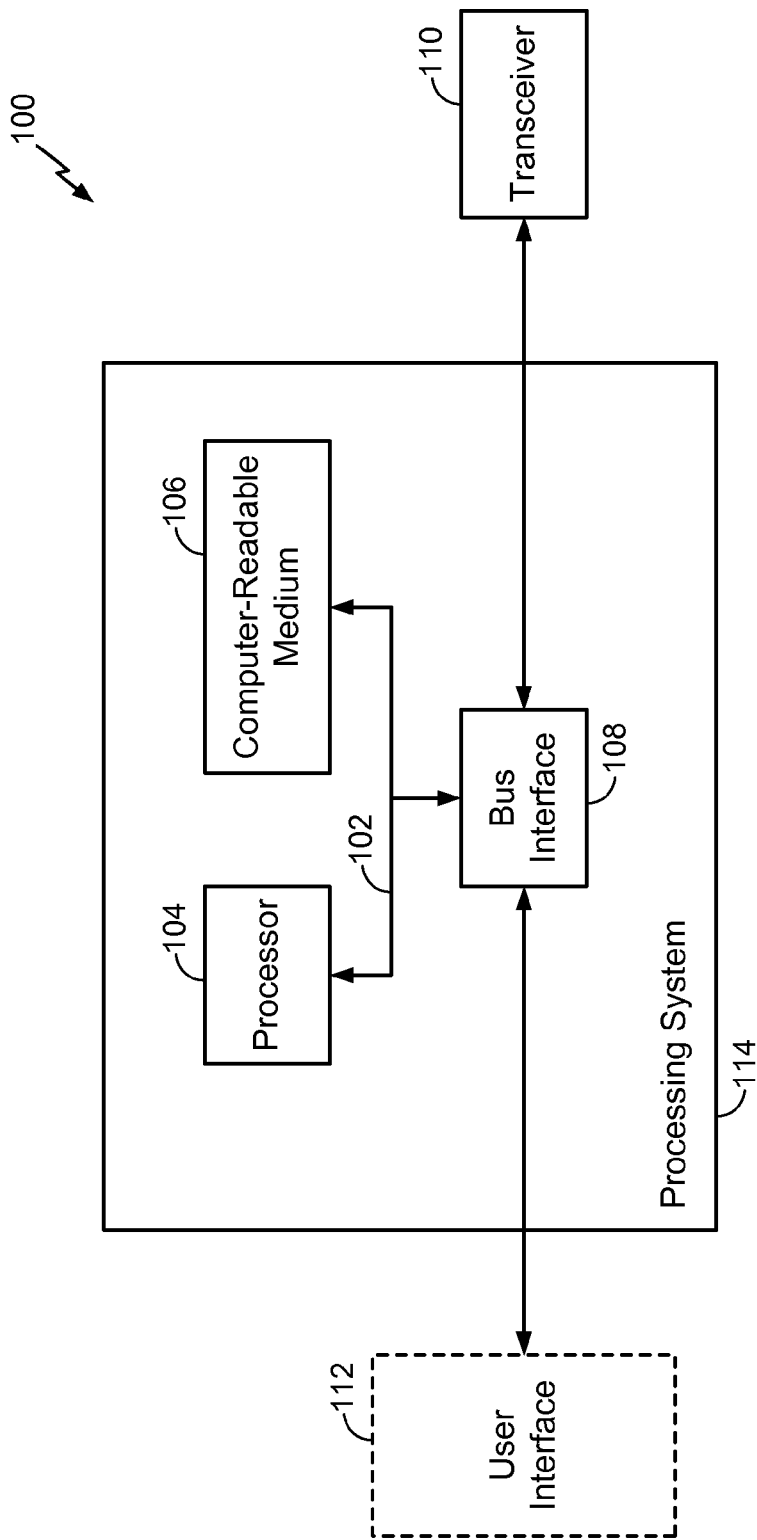
FIG. 1 is an illustration of an example of a hardware implementation for an apparatus employing a processing system according to some embodiments.
Figure 6:
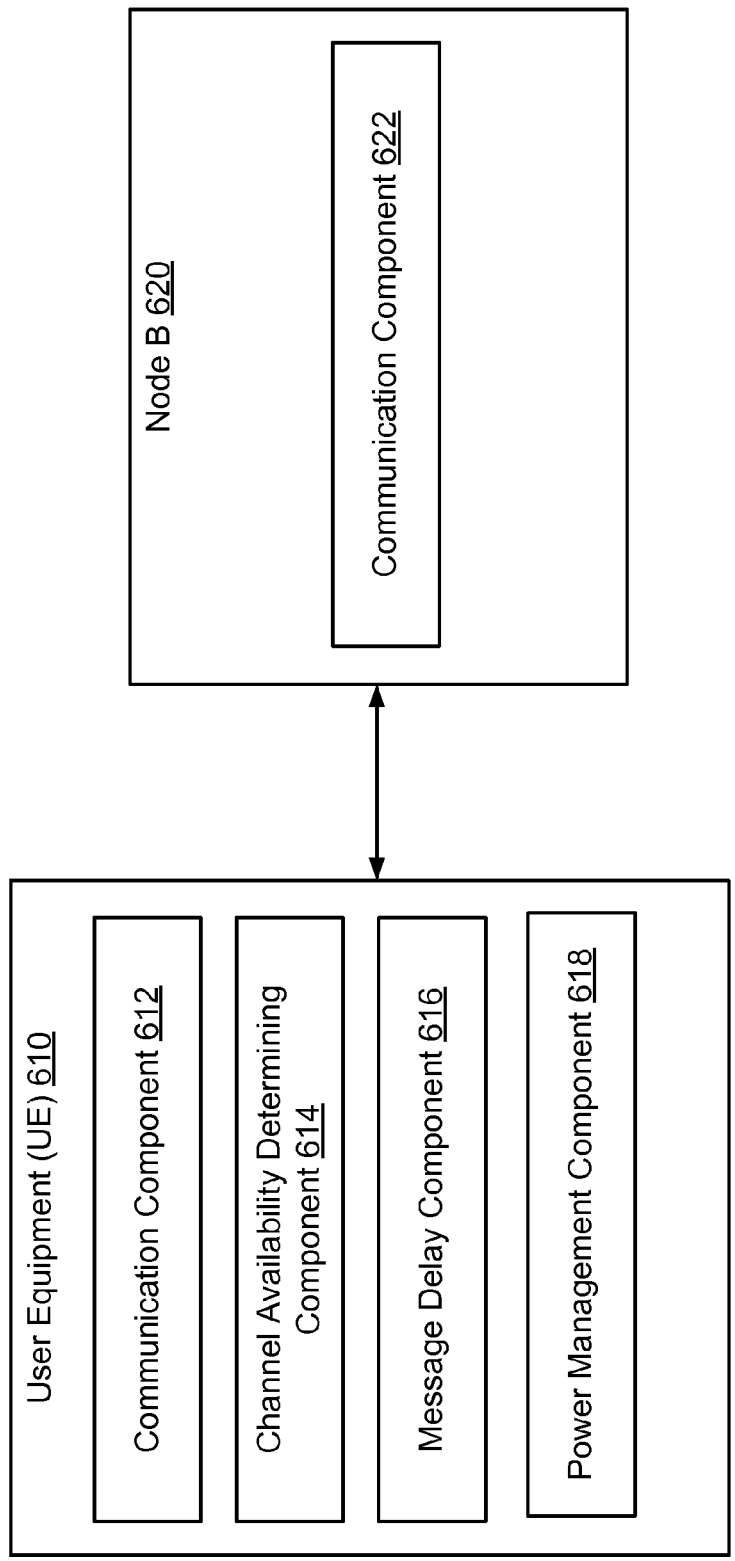
FIG. 6 is an illustration of an example an example of a Node B in communication with a UE in a telecommunications system according to some embodiments.

FIG. 1 is a block diagram illustrating an example of a hardware implementation for an apparatus 100 employing a processing system 114, wherein apparatus 100 may include user equipment (UE) 610 and/or Node B 620 of FIG. 6, or the respective functional components thereof, as described herein. In other words, in an aspect, apparatus 100 employing processing system 114 may be configured to optimize data transmissions by executing communication component 612, channel availability component 614, message delay component 616, and power management component 618 of UE 610. Alternatively, or in addition, apparatus 100 employing processing system 114 may be configured to optimize data transmissions by executing communication component 622 of Node B 620. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

The various concepts presented throughout this disclosure may be implemented across a broad variety of telecommunication systems, network architectures, and communication standards.

Figure 2:
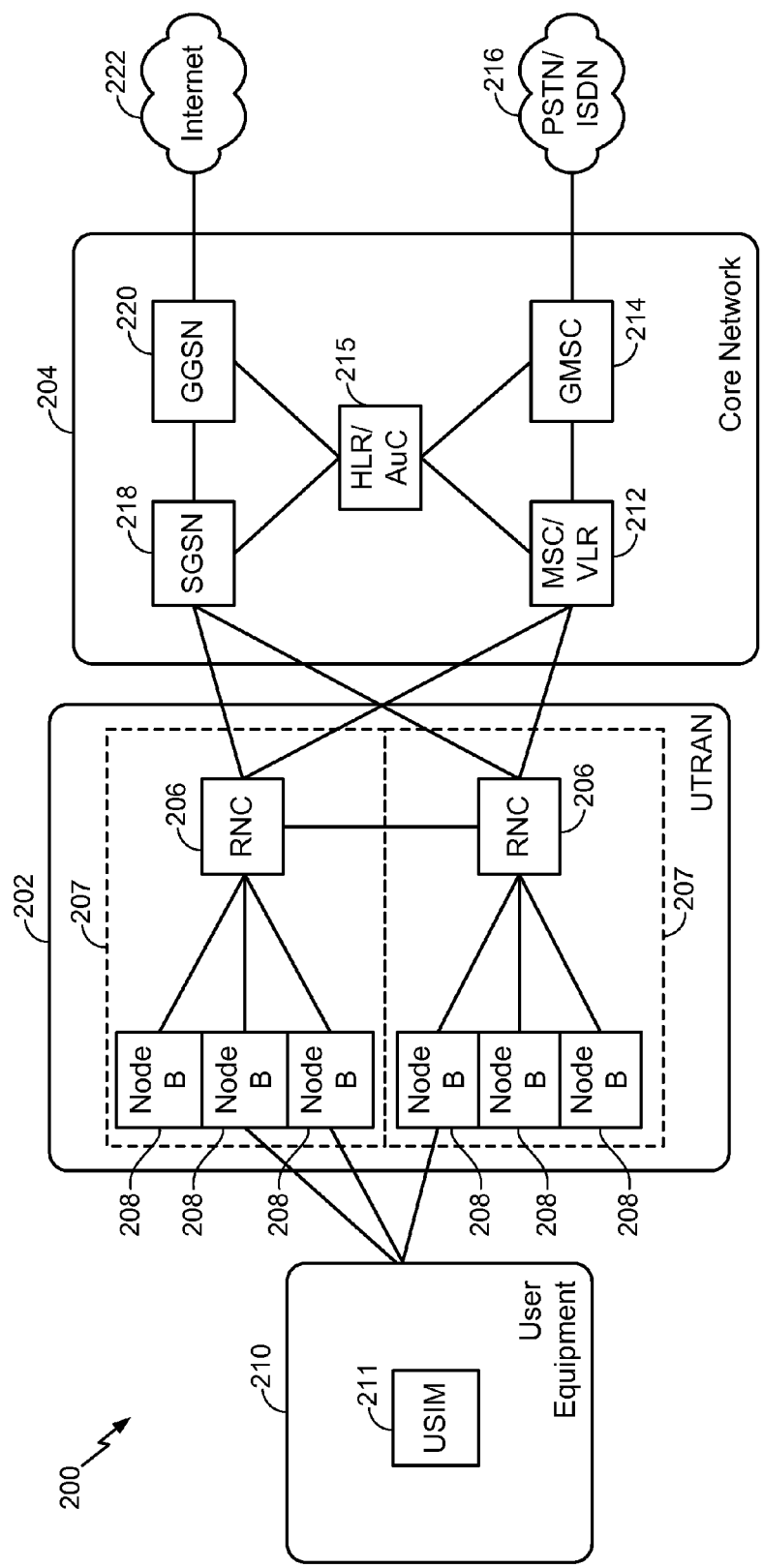
FIG. 2 is an illustration of an example of a telecommunications system according to some embodiments.

Referring to FIG. 2, by way of example and without limitation, the aspects of the present disclosure are presented with reference to a UMTS system 200 employing a W-CDMA air interface, and which may include one or more UEs 210 and one or more Node Bs 208, which may be the same as or similar to UE 610 and/or Node B 620 of FIG. 6, e.g., including the respective functional components thereof, as described herein. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 3:
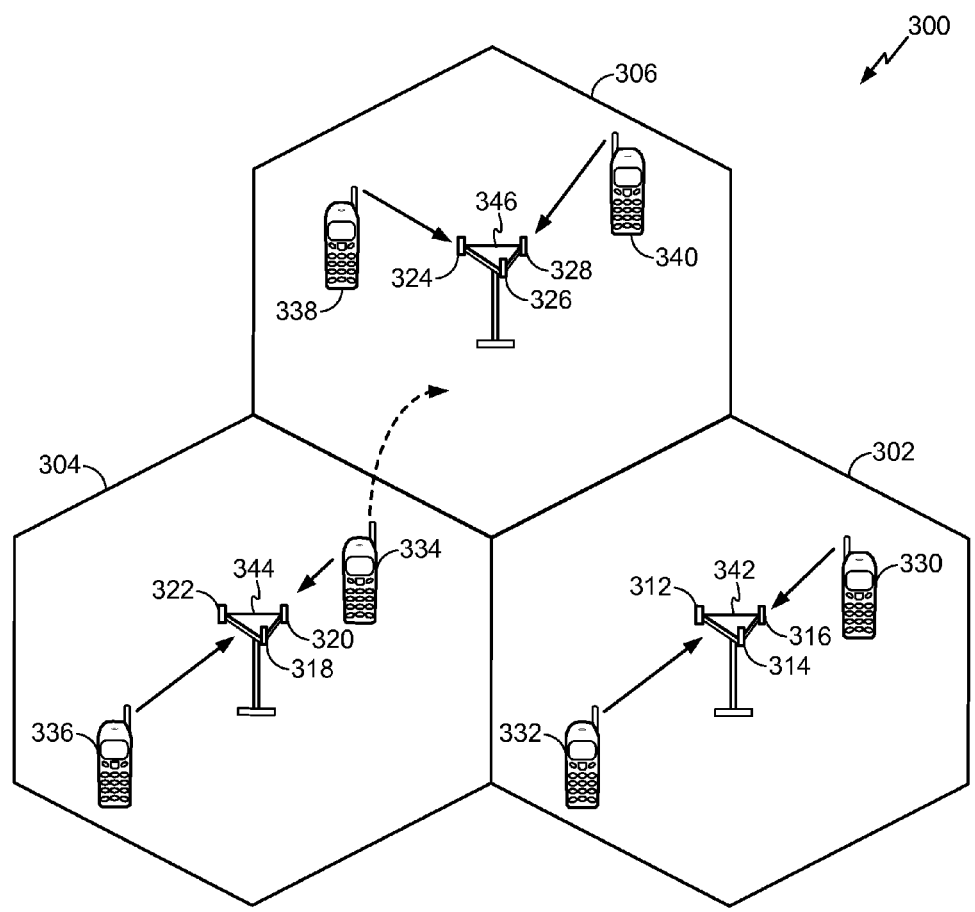
FIG. 3 is an illustration of an example an example of an access network according to some embodiments.

Referring to FIG. 3, an access network 300 in a UTRAN architecture may include one or more UEs and one or more Node Bs, which may be the same as or similar to UE 610 and/or Node B 620 of FIG. 6, e.g., including the respective functional components thereof, as described herein. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 2) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 4.

Figure 4:
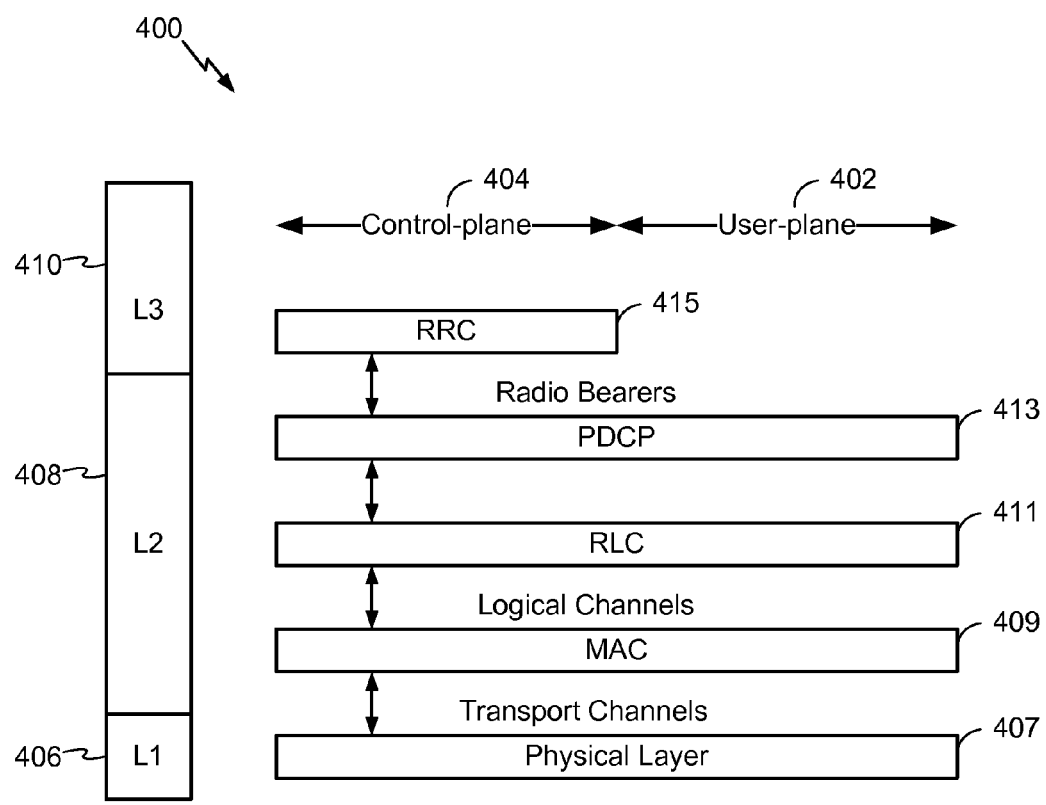
FIG. 4 is an illustration of an example an example of a radio protocol architecture for a user and control plane according to some embodiments.

Referring to FIG. 4, an example radio protocol architecture 400 relates to the user plane 402 and the control plane 404 of a UE or Node B/base station, which may be the same as or similar to UE 610 and/or Node B 620 of FIG. 6, e.g., including the respective functional components thereof, as described herein. For example, architecture 400 may be included in a UE. The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 5:
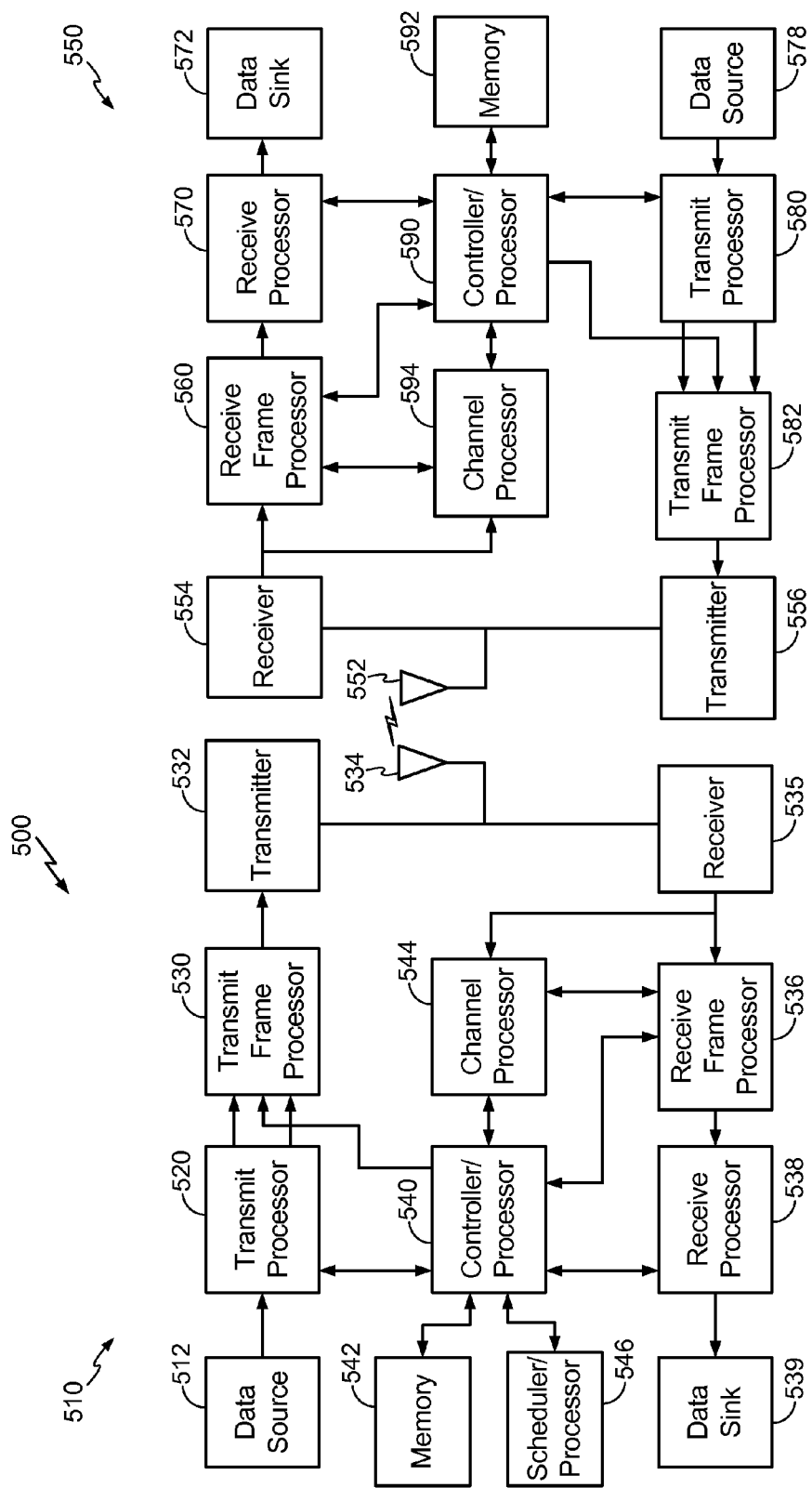
FIG. 5 is an illustration of an example wireless network environment that can be employed in conjunction with some embodiments.

FIG. 5 is a block diagram of a Node B 510 in communication with a UE 550, which may be the same as or similar to UE 610 and/or Node B 620 of FIG. 6, e.g., including the respective functional components thereof, as described herein. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Turning now to FIG. 6, a communication system 600 is shown including UE 610 for communicating with Node B 620, wherein UE 610 and/or Node B 620 are configured for optimizing data transmission. In accordance with some aspects, UE 610 may be configured for machine-to-machine (M2M) communication. UE 610 may include a communication component 612 configured to transmit to and receive data from Node B 620. Communication component 612 may be configured to, for example, receive indicators indicating the availability of a higher rate communication channel, such as a supplemental channel (SCH) in a CDMA2000 1× communication system. Communication component 612 may also be configured to transmit an origination message to Node B 620 requesting the SCH and/or the fundamental channel (FCH).

UE 610 may also include channel availability determining component 614 configured to determine whether a higher rate communication channel, such as the SCH, is available. In some aspects, the channel availability determining component 614 may be configured to periodically monitor channel availability information messages, such as SCH channel availability information messages, received from the Node B 620. UE 610 may also include a message delay component 616 for determining whether data to be transmitted can be delayed based on the availability of the SCH. For example, message delay component 616 may be configured to determine whether the data to be transmitted is time sensitive data that must be transmitted on schedule. In some aspects, the message delay component 616 may be configured to start and stop a back-off timer that indicates the maximum amount of time the UE 610 is allowed to delay the transmission of data while waiting for the SCH to become available.

In some aspects, UE 610 may be configured with a power management component 618 configured to assess the power consumption associated with delaying the transmission of data. For example, the power management component 618 may be configured to compute a first power value associated with continuing to monitor a higher data rate communication channel for availability and delaying transmission of the data for a back-off period. The power management component 618 may also compute a second power value associated with transmitting the data using a lower data rate channel (such as the FCH) when the higher data rate channel is not available. The power management component 618 may be configured to use a metric for comparing the computer power values to determine a power trade-off value.

Node B 620 may include a communication component 622 configured to periodically transmit an indicator indicating the availability of a first, higher data rate channel. In some aspects, the indicator may be transmitted via a dedicated SCH availability message that is transmitted periodically and that the UE is configured to monitor. In other aspects, the indicator may be communicated via a General Page Message (GPM) having a new field added, or appended, for signaling SCH availability. Communication component 622 may also be configured to receive requests for channel access from UE 610. Further, communication component 622 may be configured to determine whether to grant access to the first communication channel based on a class value associated with a device that sent the request, e.g., UE 610.

Figure 7:
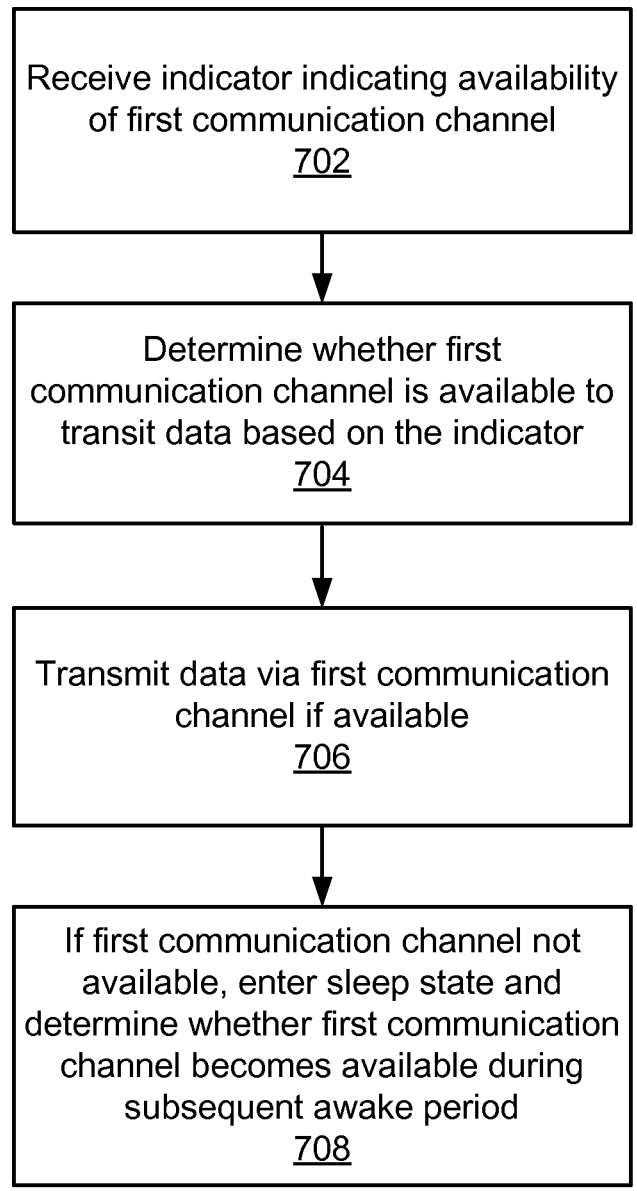
FIG. 7 is an illustration of an example methodology for optimizing data transmission according to some embodiments.

FIG. 7 depicts a method 700 for optimizing data transmission, such as but not limited to data transmission of an M2M device, in accordance with some aspects. Method 700 may be performed, for example, by a UE, such as UE 610 shown in FIG. 6. As shown at 702, the UE may receive an indicator indicating the availability of a first communication channel. For example, communication component 612 of UE 610 may receive an indicator from communication component 622 of Node B 620 indicating the availability of the first communication channel. In accordance with some aspects, the first communication channel is a channel having a higher data rate than a second communication channel. For example, where the communication system is a CDMA2000 1× communication system, the first communication channel may be a supplemental channel and the second communication channel may be a fundamental channel.

As shown at 704, the UE may determine whether the first communication channel is available to transmit data based on the first indicator. For example, channel availability determining component 612 of UE 610 may execute to determine whether the first communication channel is available to transmit data based on the first indicator, as described herein.

As shown at 706, the UE may transmit the data via the first communication channel upon determining that it is available. For example, communication component 612 of UE 610 may transmit the data via the first communication channel upon determining that it is available, as described herein.

As shown at 708, upon determining that the first communication channel is not available, the UE may enter a sleep state and again determine whether the first channel has become available during a subsequent awake period. For example, message delay component 616 of UE 610 may determine that UE 610 can enter a sleep state, and channel availability determining component 612 may determine whether the first communication channel is available during the subsequent awake period. In some aspects, the UE may use a back-off timer to limit the amount of time spent waiting for the first communication channel to become available. For example, message delay component 616 of UE 610 may be configured to start and stop a back-off timer that indicates the maximum amount of time the UE 610 is allowed to delay the transmission of data while waiting for the SCH to become available.

Figure 8:
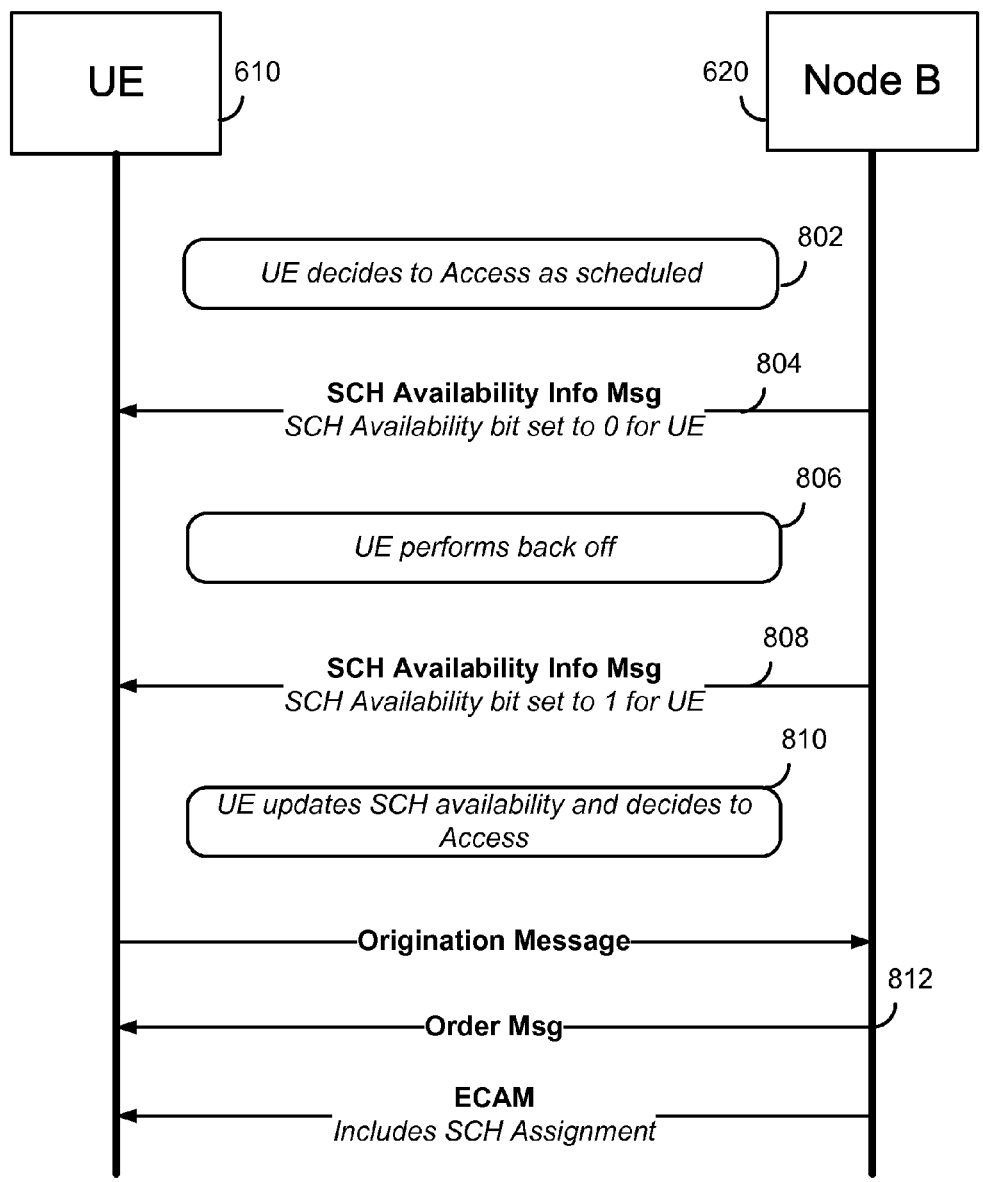
FIG. 8 is an illustration of an example communication session between a UE and a Node B according to some embodiments.

Turning now to FIG. 8, a call flow 800 is shown representing an example communication session between a mobile station (MS), such as UE 610, and a base station, such as Node B 620. The example shown in FIG. 8 illustrates communications in a CDMA2000 1× communication system. However, other communication systems may also be used. As shown at 802, the UE 610 may decide to access a communication channel to transmit data as scheduled. For example, an M2M device may be configured to transmit data periodically. As shown at 804, the UE 610 may receive a supplemental channel (SCH) availability information message. In this example, the SCH availability information message has an SCH availability bit set to zero, indicating that the SCH is not available. In some aspects, the SCH availability information message comprises a dedicated SCH availability message that is transmitted periodically and that the UE 610 is configured to monitor. In other aspects, the SCH availability message may comprise a General Page Message (GPM) having a new field added, or appended, for signaling SCH availability.

As shown at 806, upon determining that the SCH is not available, the UE 610 performs back-off. For example, the UE 610 enters a sleep state and a back-off timer is initiated to indicate an allowed time interval for delaying a transmission. As shown at 808, during a next awake interval, the UE 610 may receive another SCH availability information message. In this example, the SCH availability is now set to one, indicating that the SCH is available. As shown at 810, the UE 610 updates its knowledge of SCH availability and accesses the SCH. As shown at 812, the UE 610 and Node B 620 exchange messages on the SCH.

Figure 9:
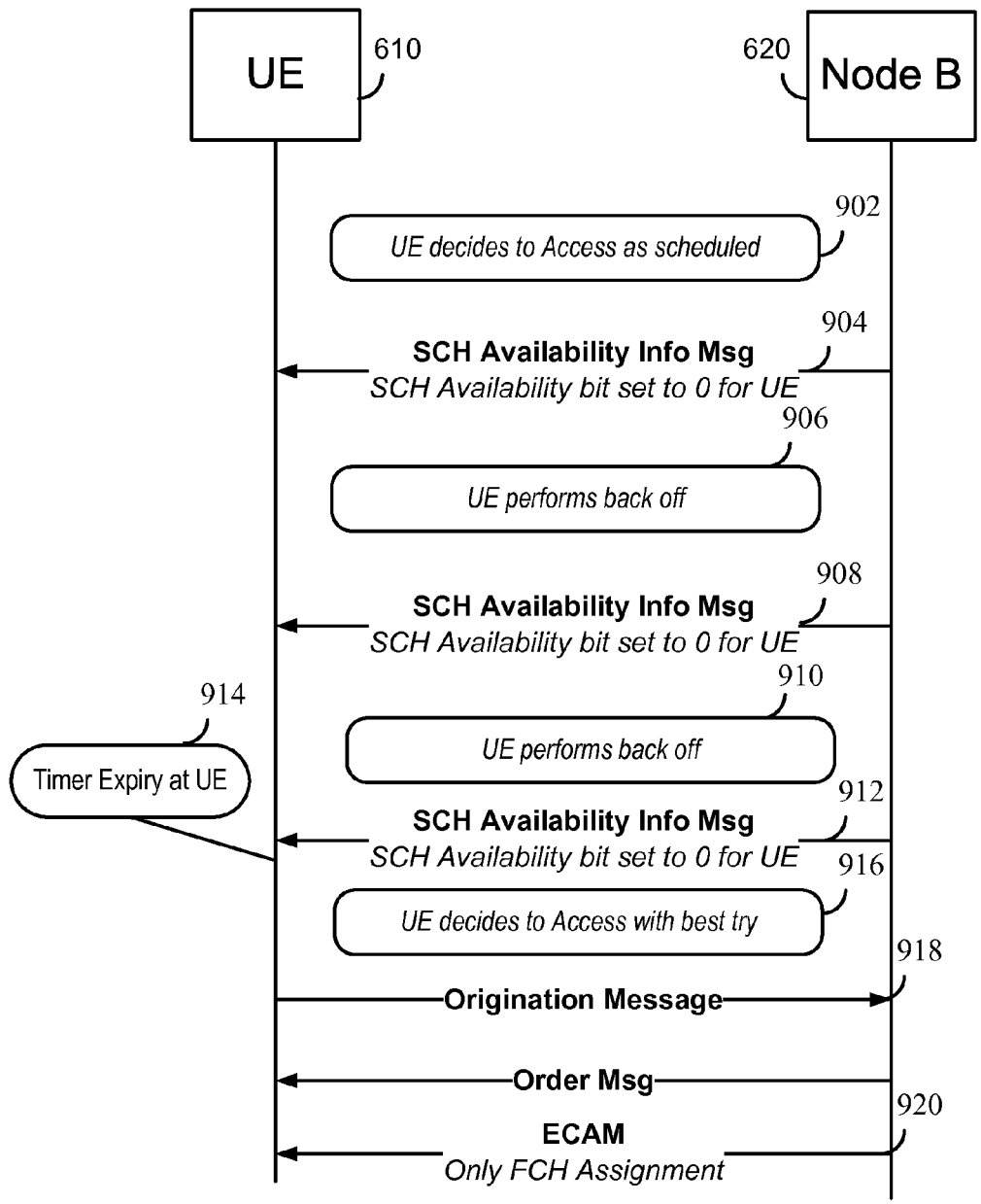
FIG. 9 is another illustration of an example communication session between a UE and a Node B according to some embodiments.

FIG. 9 depicts another call flow 900 representing another example communication session between a mobile station (MS), such as UE 610, and a base station, such as Node B 620. The example shown in FIG. 9 illustrates communications in a CDMA2000 1× communication system. However, other communication systems may also be used. As shown at 902, the UE 610 may decide to access a communication channel to transmit data as scheduled. For example, an M2M device may be configured to transmit data periodically. As shown at 904, the UE 610 may receive a supplemental channel (SCH) availability information message. In this example, the SCH availability information message has an SCH availability bit set to zero, indicating that the SCH is not available. As described above with respect to FIG. 8, the SCH availability information message may be a dedicated SCH availability message that is transmitted periodically and that the UE 610 is configured to monitor. In other aspects, the SCH availability message may be a General Page Message (GPM) having a new field added, or appended, for signaling SCH availability.

As shown at 906, upon determining that the SCH is not available, the UE 610 performs back-off. Again, the UE 610 enters a sleep state and a back-off timer is initiated to indicate an allowed time interval for delaying a transmission. As shown at 908, the UE 610 receives another SCH availability information message having the SCH availability bit set to zero. The UE 610 then performs another back-off and enters the sleep state, as shown at 910, since the back-off timer has not yet expired. Upon entering a next awake period, the UE 610 receives yet another SCH availability information message, as shown at 912. The message again indicates that the SCH is not available. As shown at 914, the back-off timer has expired. Thus, as shown at 916, the UE 610 may decide to access the SCH with a best try option. That is, in transmitting the origination message shown at 918, the UE 610 may request the SCH even though the SCH availability information messages indicated that the SCH is not available. As shown at 920, the Node B 620 sends messages to the UE 610 indicating that the UE 610 has been assigned the FCH.

Figure 10:
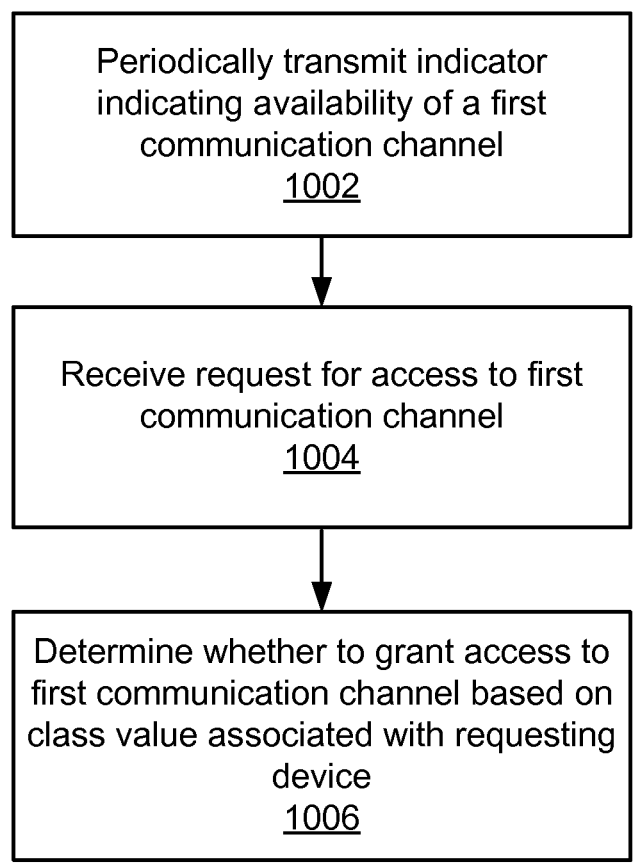
FIG. 10 is another illustration of an example methodology for optimizing data transmission according to some embodiments.

FIG. 10 is a flowchart depicting a method 1000 for optimizing data transmission, such as an M2M data transmission. In some aspects, the method 1000 may be performed by a base station or Node B, such as Node B 620 depicted in FIG. 6. As shown at 1002, the Node B may periodically transmit an indicator indicating the availability of a first communication channel having a higher data rate than a second communication channel. In some aspects, for example, communication component 622 of Node B 620 may transmit the indicator via a dedicated SCH availability message that is transmitted periodically and that the MS is configured to monitor. In other aspects, for example, communication component 622 of Node B 620 may transmit the indicator via a General Page Message (GPM) having a new field added, or appended, for signaling SCH availability.

As shown at 1004, the Node B may receive a request to access the first communication channel. In some aspects, for example, communication component 622 of Node B 620 may receive the request, which may be an origination message from a UE. As shown at 1006, the Node B may determine whether to grant access to the first communication channel based on a class value associated with the requesting device. In some aspects, for example, communication component 622 of Node B 620 may execute an algorithm to determine whether to grant access to the first communication channel, e.g., based on evaluating whether the class value associated with the requesting device meets a value threshold for granting access.

Figure 11:
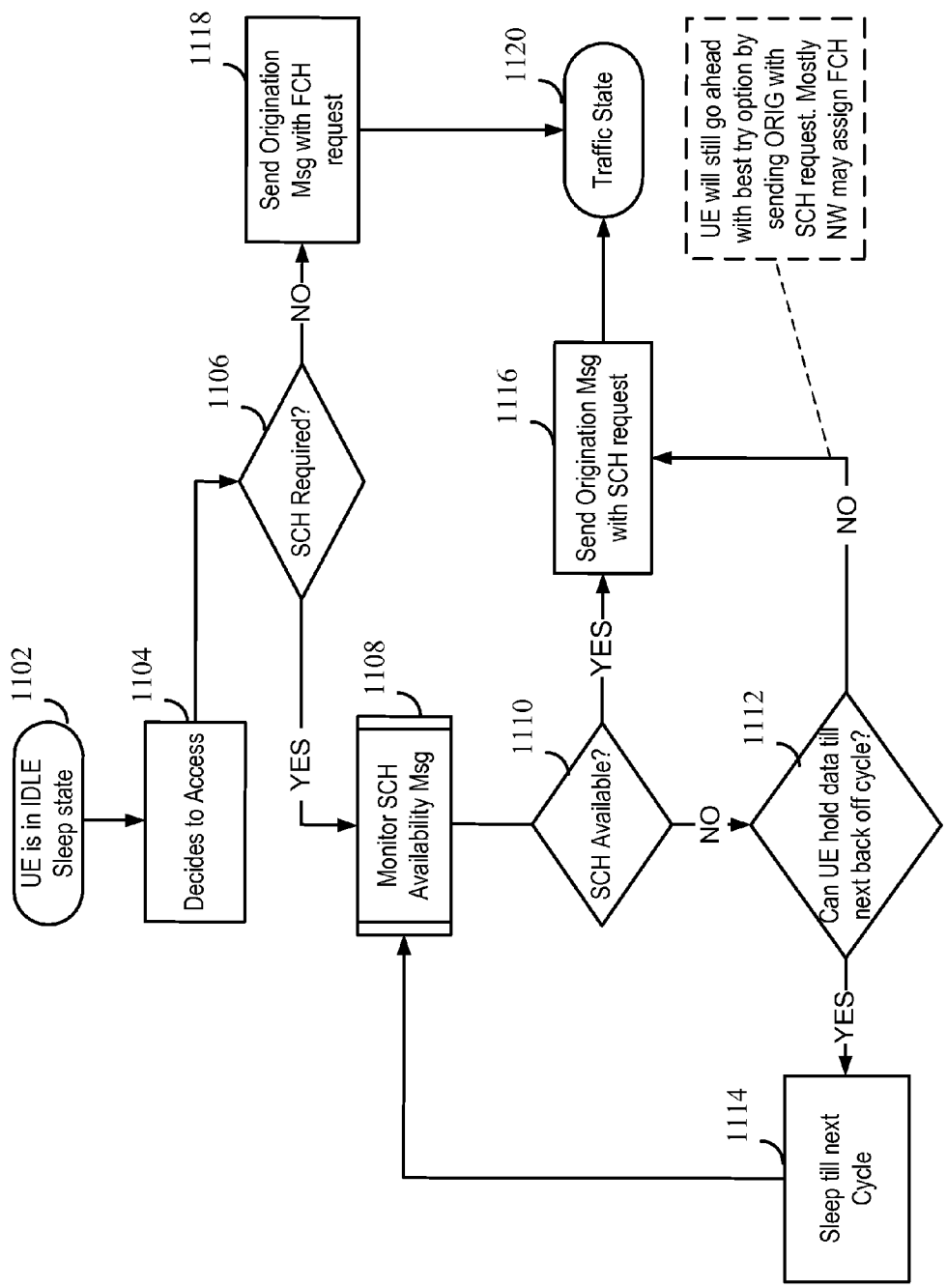
FIG. 11 is an illustration of an example methodology for communication by a UE according to some embodiments.

FIG. 11 is a flowchart depicting a method 1100 for communicating, in accordance with some aspects. The method may be performed, for example, by a mobile station or UE, such as UE 610 depicted in FIG. 6. As shown at 1102, the UE 610 may begin in an IDLE sleep state, and may decide to access a communication channel to transmit data, as shown at 1104. As shown at 1106, the UE 610 may determine whether the SCH is required to transmit the data. For example, the UE 610 may determine whether the SCH is required based on the size of the data to be transmitted. Other factors may also be considered. As shown at 1108, if the UE 610 determines that the SCH is required, the UE 610 monitors the SCH availability message. Upon receipt of an SCH availability message, the UE 610 determines whether the SCH is available, as shown at 1110.

If the SCH is not available, the UE 610 determines whether the UE 610 can hold the data until the next awake period, as shown at 1112. For example, the UE 610 may determine whether the data is time sensitive data that must be transmitted on schedule. In some aspects, the UE 610 may also determine whether a back-off timer, limiting the amount of time allowed for waiting to transmit data, has expired. If, as shown at 1114, the UE 610 determines that the data can wait, the UE 610 enters a sleep state until the next scheduled awake period where it will again monitor the SCH availability message. If the UE 610 determines that the data cannot wait, the UE 610 may transmit an origination message including an SCH request. If the UE 610 determined at step 1106 that the SCH was not required, the UE 610 may transmit an origination message including an FCH request, as shown at 1118. After transmitting the origination message, the UE 610 enters the traffic state, as shown at 1120.

In one use case, for example, systems and methodologies for optimizing data transmission may include a machine-to-machine (M2M) device that may request supplemental channel (SCH) access in an origination message in order to transmit data. However, the supplemental channel, which typically has a higher data rate than the fundamental channel (FCH) for transmitting data, may be unavailable. A typical M2M device may spend more time sending the same amount of data on the FCH than on the SCH, causing the device to use more power by keeping the modem on for a longer period of time. As such, according to the present aspects, the M2M device may be informed about SCH availability to save power. If the SCH is not available at a time when the M2M device has data to send, the M2M device may enter a sleep mode, and check for availability again during its next scheduled awake period. The M2M device may repeat this sleep and check cycle for a configurable back-off period. The back-off period may indicate a time period or a number of cycles the device is allowed to wait for the SCH to become available. If the back-off period expires and the SCH is still not available, the M2M device may transmit the data at that time even if the transmission would require use of the FCH.

Several aspects of a telecommunications system have been presented with reference to a CDMA2000 1× system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for optimizing data transmission, comprising:
   receiving, at a UE, a message from a network node, wherein the message comprises an indicator indicating whether a supplemental first communication channel is available for transmitting data, the supplemental first communication channel having a higher data rate than a communication channel available for transmitting uplink data;
   determining whether the supplemental communication channel is available to transmit data based on the indicator in the message from the network;
   transmitting the data via the supplemental communication channel instead of the communication channel, upon determining that the supplemental communication channel is available; and
   entering a sleep state, upon determining that the supplemental communication channel is not available, and determining whether the supplemental communication channel has become available for transmitting data during a subsequent awake period at least in part by periodically monitoring the indicator in the message from the network node,
   wherein entering a sleep state and determining whether the supplemental communication channel has become available during a subsequent awake period occurs until the supplemental communication channel becomes available or until an expiration of a back-off timer.

2. The method of claim 1, wherein the supplemental channel and the communication channel are channels in a CDMA2000 1× communication system.

3. The method of claim 1, wherein the supplemental first communication channel requires more power than the communication channel.

4. The method of claim 1, wherein entering a sleep state and determining whether the supplemental first communication channel has become available during a subsequent awake period further comprises delaying data transmission until the supplemental communication channel is available.

5. The method of claim 1, further comprising transmitting the data via the communication channel upon determining the back-off timer has expired and the supplemental communication channel has not become available.

6. The method of claim 1, wherein the message from the network node is received via the communication channel.

7. The method of claim 1, wherein the message from the network node includes a periodically received channel availability message associated with the supplemental communication channel.

8. The method of claim 1, wherein the message from the network node is received periodically in a field appended to a general page message.

9. The method of claim 1, wherein a value of the back-off timer is negotiated between a first machine desiring to transmit the data and a server associated with the first machine.

10. The method of claim 1, wherein a value of the back-off timer is a function of an amount of power trade-off associated with delaying the transmission of the data.

11. The method of claim 10, further comprising:
   computing a first power value associated with continued monitoring of the supplemental first communication channel for availability and delaying transmission of the data for a back-off period;
   computing a second power value associated with transmitting the data via the communication channel upon determining that the supplemental first communication channel is not available; and
   comparing the first power value and the second power to determine the amount of power trade-off.

12. An apparatus for optimizing data transmission, comprising:
   means for receiving, at a UE, a message from a network node, wherein the message comprises an indicator indicating whether a supplemental communication channel is available for transmitting data, the supplemental communication channel having a higher data rate than a communication channel available for transmitting uplink data;
   means for determining whether the supplemental communication channel is available to transmit data based on the indicator in the message from the network node;
   means for transmitting the data via the supplemental communication channel instead of the communication channel, upon determining that the supplemental communication channel is available; and means for entering a sleep state and determining whether the supplemental communication channel has become available for transmitting data during a subsequent awake period, at least in part by periodically monitoring the indicator in the message from the network node, upon determining that the supplemental communication channel is not available, wherein entering a sleep state and determining whether the supplemental communication channel has become available during a subsequent awake period occurs until the supplemental communication channel becomes available or until the expiration of a back-off timer.

13. The apparatus of claim 12, wherein the supplemental channel and the communication channel are channels in a CDMA2000 1x communication system.

14. The apparatus of claim 12, wherein the message from the network node includes a periodically received channel availability message associated with the supplemental communication channel.

15. The apparatus of claim 12, wherein a value of the back-off timer is a function of an amount of power trade-off associated with delaying the transmission of the data.

16. An apparatus for optimizing data transmission, comprising:
at least one processor configured to:
receive, at a UE, a message from a network node, wherein the message comprises an indicator indicating whether a supplemental communication channel is available for transmitting data, the supplemental communication channel having a higher data rate than a communication channel available for transmitting uplink data;
determine whether the supplemental communication channel is available to transmit data based on the indicator in the message from the network node;
transmit the data via the supplemental communication channel instead of the communication channel, upon determining that the supplemental communication channel is available; and
enter a sleep state and determining whether the supplemental communication channel has become available for transmitting data during a subsequent awake period, at least in part by periodically monitoring the indicator in the message from the network node, upon determining that the supplemental communication channel is not available,
wherein entering a sleep state and determining whether the supplemental communication channel has become available during a subsequent awake period occurs until the supplemental communication channel becomes available or until the expiration of a back-off timer; and
a memory coupled to the at least one processor.

17. The apparatus of claim 15, wherein the supplemental channel and the communication channel are channels in a CDMA2000 1x communication system.

18. The apparatus of claim 16, wherein the supplemental communication channel requires more power than the communication channel.

19. The apparatus of claim 16, wherein the at least one processor being configured to enter a sleep state and determining whether the supplemental communication channel has become available during a subsequent awake period further comprises the at least one processor being configured to delay data transmission until the supplemental communication channel is available.

20. The apparatus of claim 16, wherein the at least one processor is further configured to transmit the data via the communication channel upon determining the back-off timer has expired and the supplemental communication channel has not become available.

21. The apparatus of claim 16, wherein the message from the network node is received via the communication channel.

22. The apparatus of claim 16, wherein the message from the network node includes a periodically received channel availability message associated with the supplemental communication channel.

23. The apparatus of claim 16, wherein the message from the network node is received periodically in a field appended to a general page message.

24. The apparatus of claim 16, wherein a value of the back-off timer is negotiated between a first machine desiring to transmit the data and a server associated with the first machine.

25. The apparatus of claim 16, wherein a value of the back-off timer is a function of an amount of power trade-off associated with delaying the transmission of the data.

26. The apparatus of claim 16, wherein the at least one processor is further configured to:
compute a first power value associated with continued monitoring of the first communication channel for availability and delaying transmission of the data for a back-off period;
compute a second power value associated with transmitting the data via the second communication channel upon determining that the first communication channel is not available; and
compare the first power value and the second power to determine the amount of power trade-off.

27. A non-transitory computer-readable medium comprising:
code for:
receiving, at a UE, a message from a network node, wherein the message comprises an indicator indicating whether a supplemental communication channel is available for transmitting data, the supplemental communication channel having a higher data rate than a communication channel available for transmitting uplink data;
determining whether the supplemental communication channel is available to transmit data based on the indicator in the message from the network node;
transmitting the data via the supplemental communication channel instead of the communication channel, upon determining that the supplemental communication channel is available; and
entering a sleep state, upon determining that the supplemental communication channel is not available, and determining whether the supplemental communication channel has become available for transmitting data during a subsequent awake period at least in part by periodically monitoring the indicator in the message from the network node,
wherein entering a sleep state and determining whether the supplemental communication channel has become available during a subsequent awake period occurs until the supplemental communication channel becomes available or until the expiration of a back-off timer.

28. The computer program product of claim 27, wherein the supplemental channel and the communication channel are channels in a CDMA2000 1x communication system.

29. The computer program product of claim 27, wherein the message from the network node includes a periodically received channel availability message associated with the supplemental communication channel.

30. The computer program product of claim 27, wherein a value of the back-off timer is a function of an amount of power trade-off associated with delaying the transmission of the data.

31. A method for optimizing data transmission, comprising:
   periodically transmitting a message, the message comprising an indicator indicating whether a supplemental communication channel is available for transmitting data, the supplemental communication channel having a higher data rate than a communication channel available for transmitting uplink data;
   receiving a request for access to the supplemental communication channel; and
   determining whether to grant access to the supplemental communication channel based on a class value associated with a device that sent the request.

32. The method of claim 31, wherein periodically transmitting the message comprises generating and transmitting a channel availability message associated with the supplemental communication channel.

33. The method of claim 31, wherein the indicator comprises a field appended to an existing message.

34. An apparatus for optimizing data transmission, comprising:
   means for periodically transmitting a message, wherein the message comprises an indicator indicating whether a supplemental communication channel is available for transmitting data, the supplemental communication channel having a higher data rate than a communication channel available for transmitting uplink data;
   means for receiving a request for access to the supplemental communication channel; and
   means for determining whether to grant access to the supplemental communication channel based on a class value associated with a device that sent the request.

35. The apparatus of claim 34, wherein the means for periodically transmitting the message comprises means for generating and transmitting a channel availability message associated with the supplemental communication channel.

36. The method of claim 34, wherein the indicator comprises a field appended to an existing message.

37. An apparatus for optimizing data transmission, comprising:
   at least one processor configured to:
      periodically transmit a message, the message comprising an indicator indicating whether a supplemental communication channel is available for transmitting data, the supplemental communication channel having a higher data rate than a communication channel available for transmitting uplink data;
      receive a request for access to the supplemental communication channel; and
      determine whether to grant access to the supplemental communication channel based on a class value associated with a device that sent the request; and
   a memory coupled to the at least one processor.

38. The apparatus of claim 37, wherein the processor being configured to periodically transmit the message comprises the processor being configured to generate and transmit a channel availability message associated with the supplemental first communication channel.

39. The method of claim 37, wherein the indicator comprises a field appended to an existing message.

40. A non-transitory computer-readable medium comprising:
   code for:
      periodically transmitting a message, the message comprising an indicator indicating whether a supplemental communication channel is available for transmitting data, the supplemental communication channel having a higher data rate than a communication channel available for transmitting uplink data;
      receiving a request for access to the supplemental communication channel; and
      determining whether to grant access to the supplemental communication channel based on a class value associated with a device that sent the request.

41. The computer program product of claim 40, wherein the code for periodically transmitting the message comprises code for generating and transmitting a channel availability message associated with the supplemental communication channel.

42. The computer program product of claim 40, wherein the indicator comprises a field appended to an existing message.

43. The apparatus of claim 12, further comprising means for transmitting the data via the communication channel upon determining the back-off timer has expired and the supplemental communication channel has not become available.

44. The computer program product of claim 27, wherein the non-transitory computer-readable medium further comprises code for transmitting the data via the communication channel upon determining the back-off timer has expired and the supplemental communication channel has not become available.

* * * * *